Jan. 17, 1950  M. V. DILLINGHAM  2,495,057
TRACTOR CARRIED IMPLEMENT ATTACHING MECHANISM
Filed Jan. 21, 1946  2 Sheets-Sheet 1

INVENTOR.
Morgan V. Dillingham
BY
ATTORNEY.

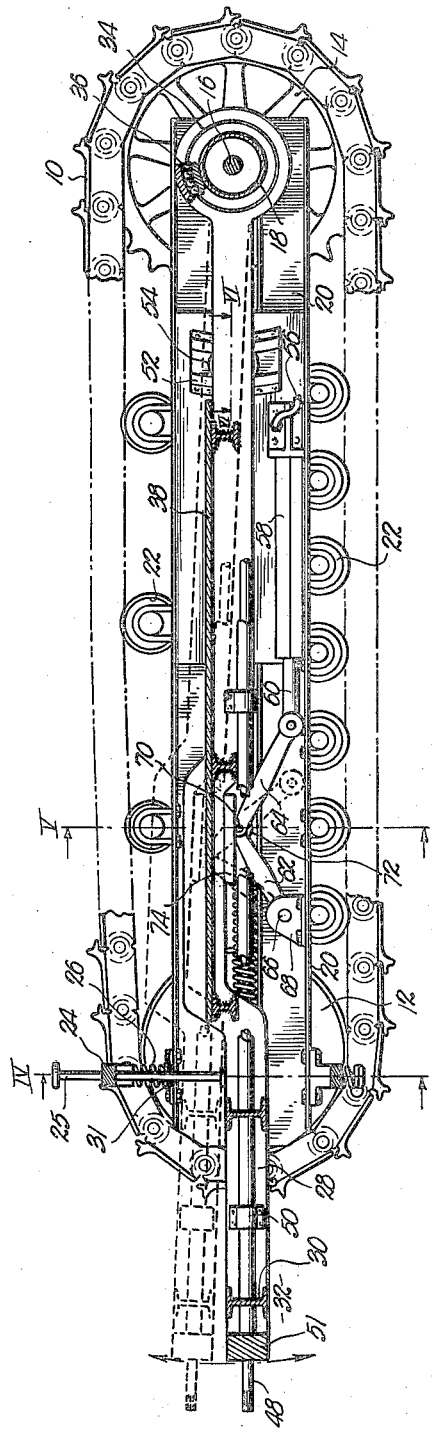

Patented Jan. 17, 1950

2,495,057

UNITED STATES PATENT OFFICE 2,495,057

TRACTOR CARRIED IMPLEMENT ATTACHING MECHANISM

Morgan V. Dillingham, Lee's Summit, Mo.

Application January 21, 1946, Serial No. 642,463

1 Claim. (Cl. 180—9.1)

This invention relates to tractors and has for its primary aim to provide such an automotive vehicle with means for attachment to an implement for both imparting power thereto and drawing the same along a path of travel.

Another object of this invention is the provision of a tractor having a chassis swingable with respect to the main frame thereof for the purpose of accommodating different types of implements as they are motivated by the tractor and receiving power from the engine of the tractor.

A further aim of this invention is to provide a tractor assembly including a swingable chassis upon which is mounted the engine which drives the tractor, the operator's seat and all controls necessary for manipulating the tractor and the implement with which it is connected through the medium of the said swingable chassis.

Other objects of the invention include the unique manner in which the chassis is swingably supported between the traction elements of the vehicle; the way in which the swingable chassis is elevated through means controllable from the operator's seat and the arrangement of the chassis with respect to the driven shaft of the tractor, all of which insures desired balance, line of draft and convenience of manipulation.

Other aims of the invention will appear during the course of the following specification referring to the accompanying drawings, wherein:

Fig. 3 is a longitudinal sectional view taken substantially along line III—III of Fig. 1 and looking in the direction of the arrows.

Fig. 4 is a detailed fragmentary cross sectional view taken on line IV—IV of Fig. 3.

Fig. 5 is a similar detailed sectional view taken on line V—V of Fig. 3 and illustrating the manner of interengagement between the swingable chassis and the means for elevating the same; and Fig. 6 is a fragmentary detailed sectional view taken on line VI—VI of Fig. 3.

Figure 1:
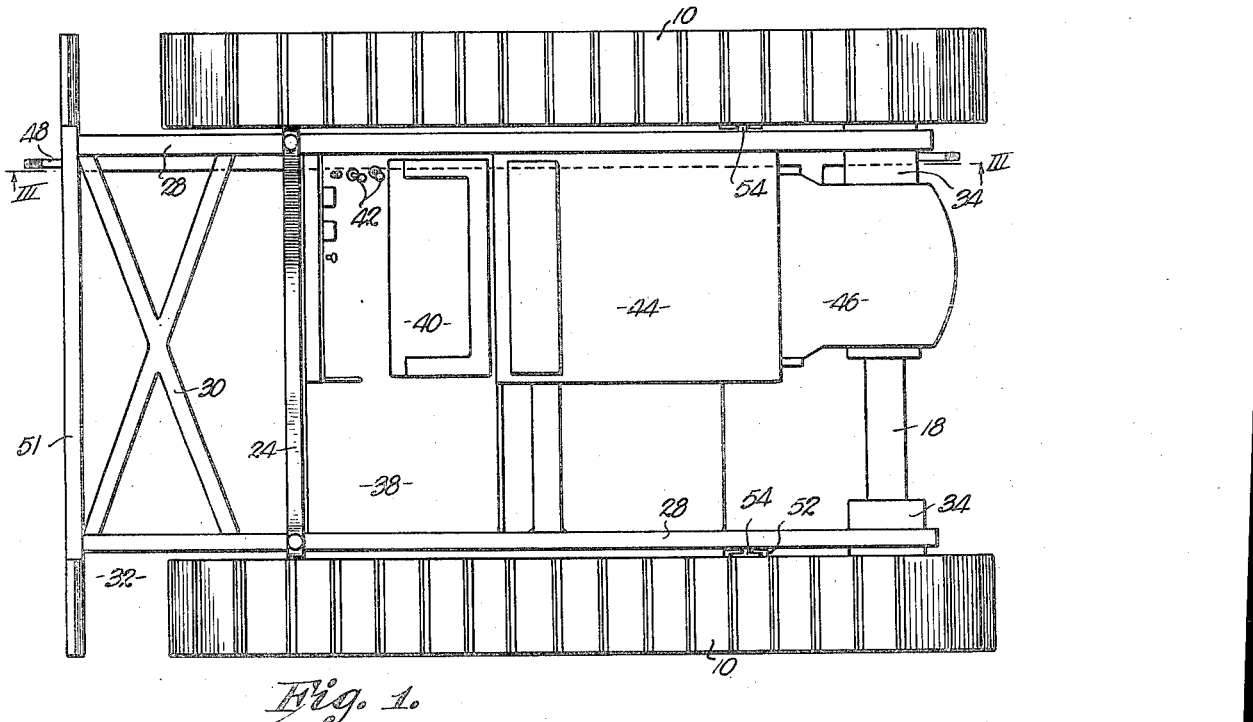
Fig. 1 is a top plan view of a tractor made pursuant to the present invention.
Figure 2:
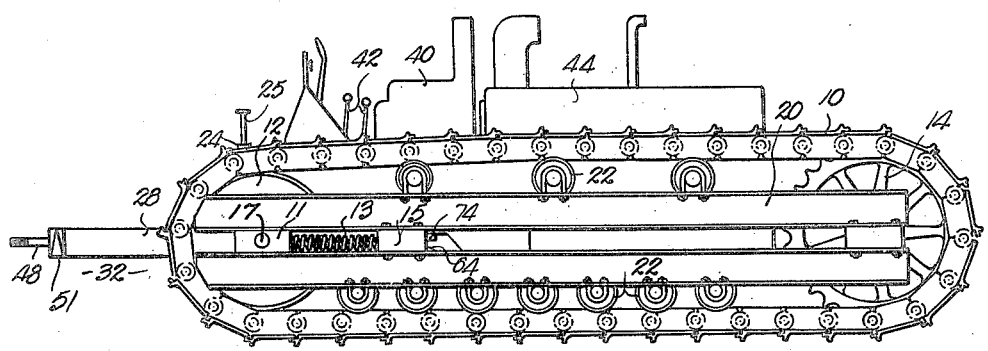
Fig. 2 is a side elevational view thereof.

The form of tractor chosen for illustration is capable of embodying the invention and includes the spaced apart opposed endless tracks 10, each of which passes around an idler wheel 12 and a sprocket wheel 14 operably connected to the driven shaft 16 within housing 18 that forms a part of frame 20. This frame mounts rollers 22 disposed between wheels 12 and 14 and the upper rollers 22 prevent undue sagging of the upper stretch of tracks 10. The lower rollers 22 serve as means for supporting the weight of the entire tractor upon the bottom stretch of track 10.

Each of the idlers 12 has a stub shaft 17 mounted in a housing 11 which is slidably connected to frame 20. A spring 13 disposed between housing 11 and block 15, is adjustably fastened to frame 20, and provides a means for maintaining proper tension in endless track 10.

A tie member 24 secured to frame 20 in a manner shown in Fig. 4 maintains the side elements of frame 20 and track 10 in spaced relation and cooperates with housing 18 in lending rigidity to the assembly. This tie member 24 is provided with springs 26 that compensate for movement of the tracks 10 and their associated parts when uneven terrain is encountered. In other words, when one track 10 is elevated slightly, springs 26 will flex and destructive twisting of tie member 24 will not occur.

The swingable chassis is disposed between tracks 10 and comprises at least two longitudinal members 28 joined by cross elements 30 and secured to housing 18 for rotation about the axis thereof. The mounting of this chassis which shall hereinafter be broadly designated by the numeral 32 is accomplished through the employment of suitable bearings 34 having friction rollers or balls 36 therein to insure easy manipulation when the chassis is to be elevated or lowered.

A platform 38 on chassis 32 carries an operator's seat 40 and such manually manipulable controls 42 as are necessary in driving the tractor through the medium of a power plant 44, which likewise is mounted upon this chassis 32. Power plant 44 is in the form of a conventional internal combustion engine or the like and such connections to driven shaft 16 as may be necessary and as are conventional are housed within the differential case 46.

A drive shaft 48 journalled in bearings 50 on chassis 32 is extended to a point where it may be operably connected to any implement with which the tractor is associated. This drive shaft 48 is joined to the power plant 44 through a take-off connection of ordinary character, which is housed within a part of case 46.

Cross bar 51 connected to longitudinal members 28 in such manner as to provide a means to connect implements to the tractor swings with chassis 32 as does drive shaft 48. Chassis 32 and the implement fastened to cross bar 51 therefore becomes a single unit with respect to the swinging motion of said chassis, and thus eliminates the necessity of connecting drive shaft 48 with the implement by means of a universal joint or means other than direct interconnection.

Side members 28 are each provided with guides comprising an arcuate member 52 carried by a part of frame 20 and a head 54 slidable in member 52 and rigid with the respective member 28. The curvature of member 52 is concentric with the axis of rotation of the entire chassis and as the latter is swung to and from the position shown in full lines of Fig. 3 for example, the brackets and their component parts serve as further stabilizing elements for tying together the spaced apart tracks 10 and their associated parts.

Quick and effective means for elevating the chassis to a point where it may be conveniently joined to an implement to be motivated by the tractor is shown in Figs. 3 and 5. The means for swinging the chassis is preferably hydraulic in character in that there is usually an hydraulic pump on the tractor which is driven by its engine 44. The tube 56 extends to this pump and supplies fluid to cylinder 58 for the purpose of forcing piston 60 longitudinally along cylinder 58 to actuate links 62 and 64 disposed as shown in Fig. 3. Link 62 has one end pivotally mounted as at 66 on a bracket 68 carried by a part of frame 20. The opposite end of link 62 is pivotally joined to one end of link 64 while the opposite end of said link 64 is pivotally joined to piston 60. The pivotal connection between links 62 and 64 comprises a cross pin 70 upon which a roller 72 is mounted for disposition below member 28 of chassis 32. This roller 72 travels in a track 74 provided along the lower edge of member 28 and as the roller moves through its path of travel, lateral displacement is prevented.

There is means for elevating chassis 32 at each side thereof and the valve for controlling the passage of fluid under pressure through tube 56 is within easy reach of the driver's seat 40. Therefore, when the chassis is to be elevated, such may be accomplished with ease and despatch.

When the chassis 32 is to be lowered, the hydraulic pressure is released and the entire chassis with all parts mounted thereon, descends through the action of gravity about its axis of rotation on housing 18.

Chassis 32 may be held in a rigid position with respect to frame 20 by elevating chassis 32 so as to contact pins 25 as hereinafter more fully described, or hydraulic pressure may be released, allowing chassis 32 to swing freely while the tractor is in use, depending on the type of implement connected with the chassis and the desired result with respect to the operation of said implement.

The swinging or adjustment of chassis 32 does not effect the center of gravity of the tractor nor any of its parts including tracks 10. Therefore, the operation of the tractor is not effected nor altered because of the presence of chassis 32 but it is possible to couple the tractor to various types of farm implements for example, and draw the same along a path where work may be accomplished. If the implement is in need of power to motivate some of its mechanism, connection may be quickly made to drive shaft 48.

Pins 25, substantially near each end of tie member 24, which prevent chassis 32 from swinging beyond a predetermined position upwardly with respect to frame 20, have a plurality of perforations 27 and pass through holes 29 in tie member 24. Keys 31 inserted in one of the perforations 27 of each pin, in the manner shown in Fig. 4, prevent the upward movement of pins 25 when chassis 32 comes in contact with the pins in its attempted upward movement.

The positioning of the driver's seat 40 and controls 42 on chassis 32 insures that the driver or operator of the tractor and associated implements, will be in a place where full vision is insured.

Other advantages and modes of constructing the tractor and portions thereof which embody the invention will become apparent to those skilled in the art and while the preferred form of the invention has been illustrated and described, it is realized that changes and modifications may be made without departing from the spirit of the invention or scope of the appended claim.

Having thus described the invention, what is claimed as new and desired to be secured by Letters Patent is:

In a tractor having a frame provided with a pair of spaced side members, an endless, ground-engaging crawler belt operably mounted on each side member respectively, an axle joining the belts at one end thereof, a prime mover for said belts, and an operator's platform; the improvement of which comprises a substantially horizontal, elongated, flat chassis spanning the distance between the belts and pivoted at one end thereof to said axle, said chassis extending outwardly beyond the opposite end of the belts; mechanism on each side member respectively underlying said chassis near said opposite end of the belts for swinging the chassis on said axle, said chassis being adapted to carry said prime mover and said platform for swinging movement as a unit therewith; and implement attaching means rigidly secured to said outwardly extending end of the chassis, and swingable therewith.

MORGAN V. DILLINGHAM.

REFERENCES CITED

The following references are of record in the file of this patent:

UNITED STATES PATENTS

| Number | Name | Date |
|---|---|---|
| 923,454 | Stearns | June 1, 1909 |
| 1,243,035 | Blackburn | Oct. 16, 1917 |
| 1,400,690 | Lewis | Dec. 20, 1921 |
| 1,914,692 | Kakaska | June 20, 1933 |
| 1,991,781 | Bird | Feb. 19, 1935 |
| 2,064,022 | Maloon | Dec. 15, 1936 |
| 2,312,390 | Cordes | Mar. 2, 1943 |

FOREIGN PATENTS

| Number | Country | Date |
|---|---|---|
| 139,826 | Great Britain | Mar. 18, 1920 |